US008351522B2

(12) United States Patent
Maltsev et al.

(10) Patent No.: US 8,351,522 B2
(45) Date of Patent: Jan. 8, 2013

(54) INTERFERING BASE STATIONS RECOGNITION METHOD AND SCHEME FOR 802.16E SYSTEMS

(75) Inventors: Alexander Maltsev, Nizhny Novgorod (RU); Audrey Pudeyev, Nizhny Novgorod (RU); Alexei Davydov, Nizhny Novgorod (RU); Sergey Tiraspolsky, Nizhny Novgorod (RU); Alexey Rubstov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 687 days.

(21) Appl. No.: 12/442,942

(22) PCT Filed: Sep. 29, 2006

(86) PCT No.: PCT/RU2006/000506
§ 371 (c)(1),
(2), (4) Date: Dec. 21, 2009

(87) PCT Pub. No.: WO2008/039096
PCT Pub. Date: Apr. 3, 2008

(65) Prior Publication Data
US 2010/0091895 A1    Apr. 15, 2010

(51) Int. Cl.
*H04L 27/28* (2006.01)
(52) U.S. Cl. ........ 375/260; 375/341; 375/259; 375/340; 375/316
(58) Field of Classification Search .................. 375/260, 375/341, 259, 340
See application file for complete search history.

(56) References Cited

U.S. PATENT DOCUMENTS

| 7,076,015 B2 * | 7/2006 | Bhatoolaul et al. ........... 375/365 |
| 7,580,490 B2 * | 8/2009 | Suh et al. ...................... 375/349 |
| 7,684,529 B2 * | 3/2010 | Chimitt et al. ................ 375/350 |
| 2005/0111522 A1 * | 5/2005 | Sung et al. .................... 375/145 |

OTHER PUBLICATIONS

International Search Report and Written Opinion from PCT/RU2006/000506, mailed Aug. 30, 2007, 12 pgs.
International Preliminary Report on Patentability from PCT/RU2006/000506, mailed Apr. 9, 2009, 7 pgs.
Suh, Changho et al., "Channel Estimation technique or mitigating ICI in MIMO-OFDM Cellular Systems", Global Communications Conference 2004 (Nov. 29, 2004), 2679-2683, 5 pgs.
Zhang, Lili, "A Study of IEEE 802.16a OFDM-PHY Baseband", (Feb. 16, 2005), 78 pages.
"Non-Final Office Action for Korean Patent Application No. 10-2009-7004836", (Aug. 19, 2010).
"Office Action for Chinese Patent Application No. 200680055688.7", (Jun. 29, 2011).
"Office Action for Chinese Patent Application No. 200680055688.7", (Jun. 20, 2012).
"Office Action for European Patent Application No. 06849591.0", (Mar. 12, 2012).

* cited by examiner

*Primary Examiner* — Kenneth Lam
(74) *Attorney, Agent, or Firm* — Blakely, Sokoloff, Taylor & Zafman LLP

(57) ABSTRACT

A method and apparatus for identifying the preamble for an unknown signal received in Orthogonal Frequency Division Multiplexing (OFDM) communications. In one embodiment, the preamble is identified from a set of known preambles using a detection statistic based on a generalized likelihood ratio (GLR) method. In another embodiment, the GLR detection statistic relies on a priori assumptions about a transfer function represented by the received signal.

27 Claims, 4 Drawing Sheets

INTERFERING BASE STATIONS RECOGNITION METHOD AND SCHEME FOR 802.16E SYSTEMS

BACKGROUND OF THE INVENTION

1. Field of the Invention

The invention relates generally to wireless communications technology. More particularly, an embodiment of the invention determines signal characteristics for transmissions using Orthogonal Frequency Division Multiplexing (OFDM).

2. Background Art

Modern wireless communication systems frequently rely on the advantages of OFDM and Orthogonal Frequency Division Multiple Access (OFDMA), referred to collectively herein as OFDM(A). In particular, wireless communication systems commonly implement Institute of Electrical and Electronics Engineers (IEEE) standards such as the IEEE 802.16 standards for Wireless Metropolitan Area Networks (WMANs), including the IEEE 802.16e Draft Amendment to IEEE Standard for Local and Metropolitan Area Networks—Part 16: Air Interface for Fixed Broadband Wireless Access Systems—Physical and Medium Access Control Layers for Combined Fixed and Mobile Operation in Licensed Bands, 2004.

For the downlink (DL) mode of operation, a main reason for performance degradation in wireless systems is interference from neighboring OFDM(A) transmitters. For example, the performance degradation caused by the internal noise of a receiver is usually less than that caused by the power of an interfering signal from a nearby base station (BS). A BS or mobile units receiving OFDM(A) communications of the IEEE 802.16e type must account for interfering signals from surrounding OFDM transmitters. Previously, cancellation of these interfering signals depended on complex calculation of interference correlation matrices. The usefulness of these correlation matrices in selecting adaptive communications techniques, however, is limited to particular channel environments.

Recognizing a strongest interfering OFDM(A) signal and determining its encoding characteristics is useful, for example, in deriving information for selective interference cancellation in signal transmission. IEEE 802.16e communications send information in data frames which start with a downlink (DL) preamble. The DL preamble is transmitted in one of three defined subcarrier sets, each subcarrier set utilizing every third subcarrier starting from some predetermined number. DL preambles of an interfering signal provide a way for evaluating that signal and adjusting wireless communications to account for its effects.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
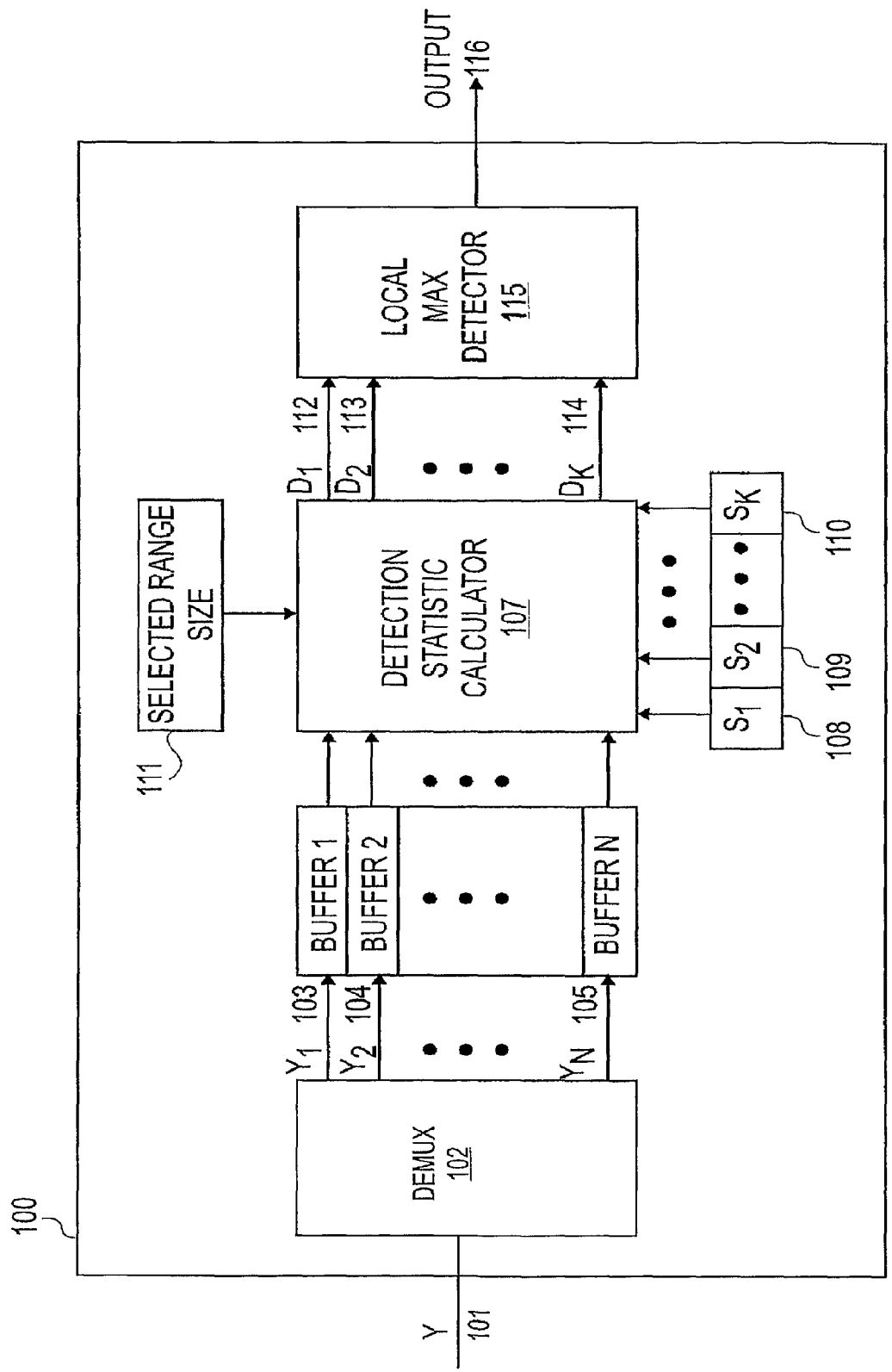
FIG. 1 is a block diagram illustrating a system or device to implement one embodiment of the invention.

Techniques and architectures for analyzing OFDM signals are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the communications arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and displays presented herein are not inherently related to any particular computer or other apparatus.

Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Systems and architectures for determining characteristics of an OFDM(A) signal are described herein. FIG. 1 illustrates a system or device implementing one embodiment. Identifying the DL preambles and the relative strength of signals from different BSs mixed at the receiver side is achieved in one embodiment. One classical approach to the problem of signal detection and recognition is matched filtering (MF), which determines a correlation of a known signal to the unknown received signal. It is known that MF is optimal for the case of a communication channel subject to additive white Gaussian noise (AWGN). However, in realistic channel models with multipath propagation, the MF is no longer optimal and its performance may seriously degrade. Compared to MF, embodiments of the present invention identify a preamble and other signal characteristics in a wider range of channel environments.

Embodiments of the current invention use a generalized likelihood ratio (GLR) method. This method uses a likelihood ratio as a detection statistic, in which all unknown parameters of signal and noise are substituted by their maximum likelihood (ML) estimates, obtained from the observed signal realization. In the following case, the receiver detects a signal vector y across arrange of subcarriers, where a component of y for subcarrier n may be expressed as:

$$y(n)=H(n)s(n)+w(n) \quad (1)$$

where y(n) is a received DL preamble signal in the frequency domain at the n-th subcarrier, H(n) is the transfer function at this subcarrier, s(n) is transmitted signal in the frequency domain and w(n) is AWGN signal in the frequency domain. In many realizations of OFDM(A) communications, the contribution of the interfering signal H(n)s(n) to the received signal y(n) dominates that of the internal receiver noise component w(n). In such cases, the likelihood function representing a probability density function of observed signal vector y, can be written as:

$$p(y) = \frac{1}{(2\pi)^{N/2}} \exp\left\{-\frac{\sum_{n=1}^{N}|y(n) - H(n)s(n)|^2}{2\sigma_w^2}\right\} \quad (2)$$

In cases where H(n) is unknown, the GLR methodology may utilize some estimation $\hat{H}(n)$ of the channel parameters H(n) in order to calculate the likelihood function for the observed signal vector y. From transforms of the above equation (2), the final GLR detection statistic can be written as:

$$D = -\sum_{n=1}^{N}|y(n) - \hat{H}(n)s(n)|^2 \quad (3)$$

Thus, the most likely value of transmitted preamble s may be obtained by minimizing the above equation for D. For determining D, the value N may represent any set of subcarriers for which interference detection is sought. For example, the set of subcarriers may constitute an entire OFDM(A) channel, a localized OFDM(A) subchannel, or a distributed OFDM(A) subchannel.

In various embodiments, the system or device 100 may comprise, or be implemented as, software, a software module, an application, a program, a subroutine, an instruction set, computing code, words, values, symbols or combination thereof. A system or device may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, micro-code for a network processor, and so forth. In alternative embodiments, hard-wired circuitry can be used in place of or in combination with software instructions to implement the invention. Thus, the invention is not limited to any specific combination of hardware circuitry and software instructions.

In various implementations, the system or device 100 may form part of a multi-carrier system such as a Multiple Input, Multiple Output (MIMO) system for conveying multiple data streams to multiple antennas. Such a MIMO system may, for example, be compliant with the IEEE 802.16e standard. In such embodiments, the wireless communications media may comprise one or more multi-carrier communications channels for communicating multi-carrier communication signals. A multi-carrier channel may comprise, for example, a wideband channel comprising multiple sub-channels. The embodiments are not limited in this context.

The system or device 100 may comprise or form part of a network. The network may be any of a variety of OFDM(A) networks such as one compliant with the IEEE 802.16e standard, a Worldwide Interoperability for Microwave Access (WiMAX) network, a broadband wireless access (BWA) network, a wireless local area network (WLAN), a wireless wide area network (WWAN), a wireless metropolitan area network (WMAN), or a wireless personal area network (WPAN). The system or device 100 may communicate information in accordance with one or more standards, such as standards promulgated by the Institute of Electrical and Electronics Engineers (IEEE). In various embodiments, for example, the system or device 100 may communicate information according to one or more IEEE 802 standards including IEEE 802.11g (release date June 2003) for WLANs and/or IEEE 802.16 standards (e.g., IEEE 802.16-2004, IEEE 802.16.2-2004 and variants) for WMANs.

The system of device 100 illustrates the calculation of a detection statistic according to one embodiment. A signal y 101 may be received into the system or device 100 as input to a demultiplexer 102. The demultiplexer 102 may separate signal Y 101 into its constituent subcarrier signals y(1) 103, y(2) 104 ... y(N) 105. The subcarrier signals may be stored in buffers for calculation of detection statistics by a detection statistic calculator 107. In other embodiments, the detection statistic calculator 107 may be adapted to perform these calculations in real-time without the need to buffer subcarrier signals y(1) 103, y(2) 104 ... y(N) 105. The detection statistic calculator 107 may calculate one detection statistic for each of the preambles in the set of preambles $s_1$ 108, $s_2$ 109 ... $s_K$ 110. In one embodiment, the detection statistic calculator 107 may make an estimation $\hat{H}(n)$ of a component of the transfer function, H(n), to calculate the detection statistic for a preamble in the set of preambles $s_1$ 108, $s_2$ 109 ... $s_K$ 110. To calculate a detection statistic based on the estimation $\hat{H}(n)$, the detection statistic calculator 107 may use the subcarrier signals y(1) 103, y(2) 104 . . . y(N) 105, the set of preambles $s_1$ 108, $s_2$ 109 . . . $s_K$ 110, and a selected range size 111. As described below, the selected range size 111 may be used to represent a number of subcarrier frequencies neighboring a given subcarrier frequency in the frequency domain.

The detection statistic calculator 107 may output detection statistics $D_1$ 112, $D_2$ 113, . . . $D_K$ 114 corresponding to the preambles $s_1$ 108, $s_2$ 109 . . . $s_K$ 110. These detection statistics $D_1$ 112, $D_2$ 113, $D_K$ 114 are sent to a maximum detector 115 which identifies one or more DL preambles having a sufficiently large detection statistic. These results are then provided as output 116 to be either stored, displayed, used to identify other characteristics of the OFDM(A) signal, or otherwise used to select any of a variety of OFDM communication technique. Such communications techniques include, but are not limited to an interference cancellation technique, a signal decoding technique, a dynamic band selection technique, and an application scheduling technique.

The system or device 100 implements a different convention as to sign from that described by equation (3) above. Specifically, the system or device 100 identifies one or more DL preambles having a maximum detection statistic—rather than a minimum—because the detection statistic calculator 107 foregoes the −1 factor of D in equation (3). Various embodiments may identify a D value by this method.

Figure 2:
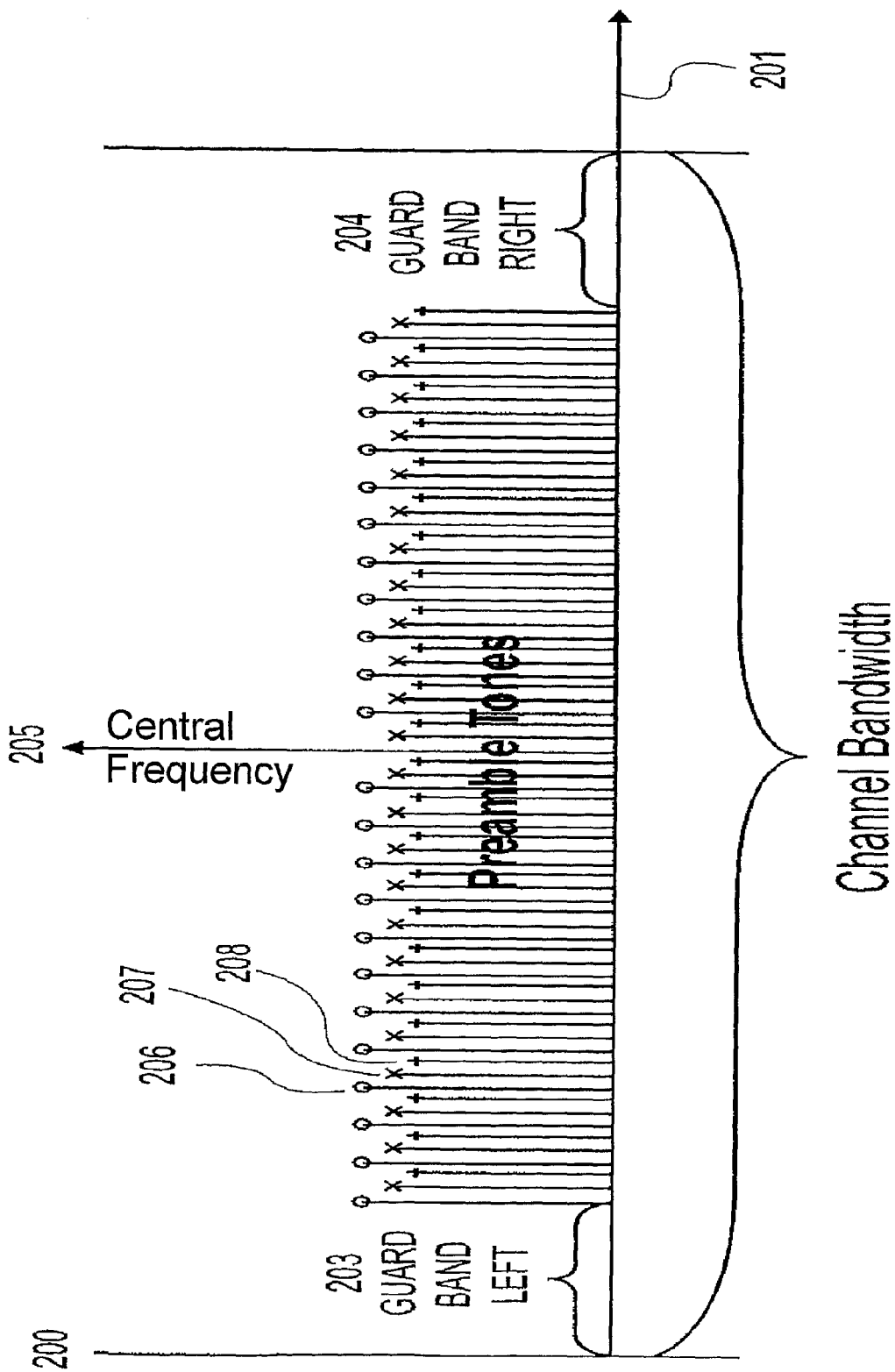
FIG. 2 is a frequency diagram illustrating a frequency distribution of preambles used in practicing one embodiment of the invention.

FIG. 2 illustrates the components of a preamble signal sent within an OFDM(A) channel 200. In various embodiments, the preamble structure may be implemented according to the IEEE 802.16e standard. In this embodiment, the OFDM(A) channel 200, as presented in the frequency domain 201, is centered on a central frequency 205, and is delimited by a left guard band 203 and a right guard band 204, which isolate the channel 200 from the interfering signals of adjoining OFDM (A) channels. According to IEEE 802.16e, each data frame transmitted in a downlink mode shall start with a DL preamble. In various implementations, the DL preamble is transmitted in one of three defined subcarrier sets, each subcarrier set utilizing every third subcarrier. As illustrated in FIG. 2, subcarriers of different subsets are shown with differently-ended lines. For example, subcarriers 206, 207 and 208 each represent a subcarrier from their respective subcarrier sets. Embodiments are not limited in the context of how preambles are distributed within a range of subcarriers.

The subcarriers used for the DL preamble structure may be modulated. For example, in IEEE 802.16e, the subcarriers used for the DL preamble may be modulated by binary phase-shift keying (BPSK) using one from 114 pseudo-random sequences defined in the IEEE 802.16e standard. A preamble is identified by an identifier (Preamble_IDs) which plays an important role in further frame decoding. Specifically, the Preamble_ID contains the information about pilot pseudo-random sequence generation.

When an OFDM(A) receiver has no particular information about a transfer function of a received signal, only N observed values y(n) are available for identification of the preamble. A solution such as that for equation (3) is complicated by the existence of 2N unknown parameters from H(n) and s(n). To resolve this issue, an embodiment can employ either additional observations of y(n) or rely on some a priori information about transfer function H(n).

An estimate of the transfer function may be made by assuming that, in the frequency domain, the transfer function at a given subcarrier is sufficiently smooth for linear approximation over an interval of adjoining subcarriers. Thus, transfer function H(n) at given n-th subcarrier may be estimated as an average of channel estimates from adjacent subcarriers.

Figure 3:
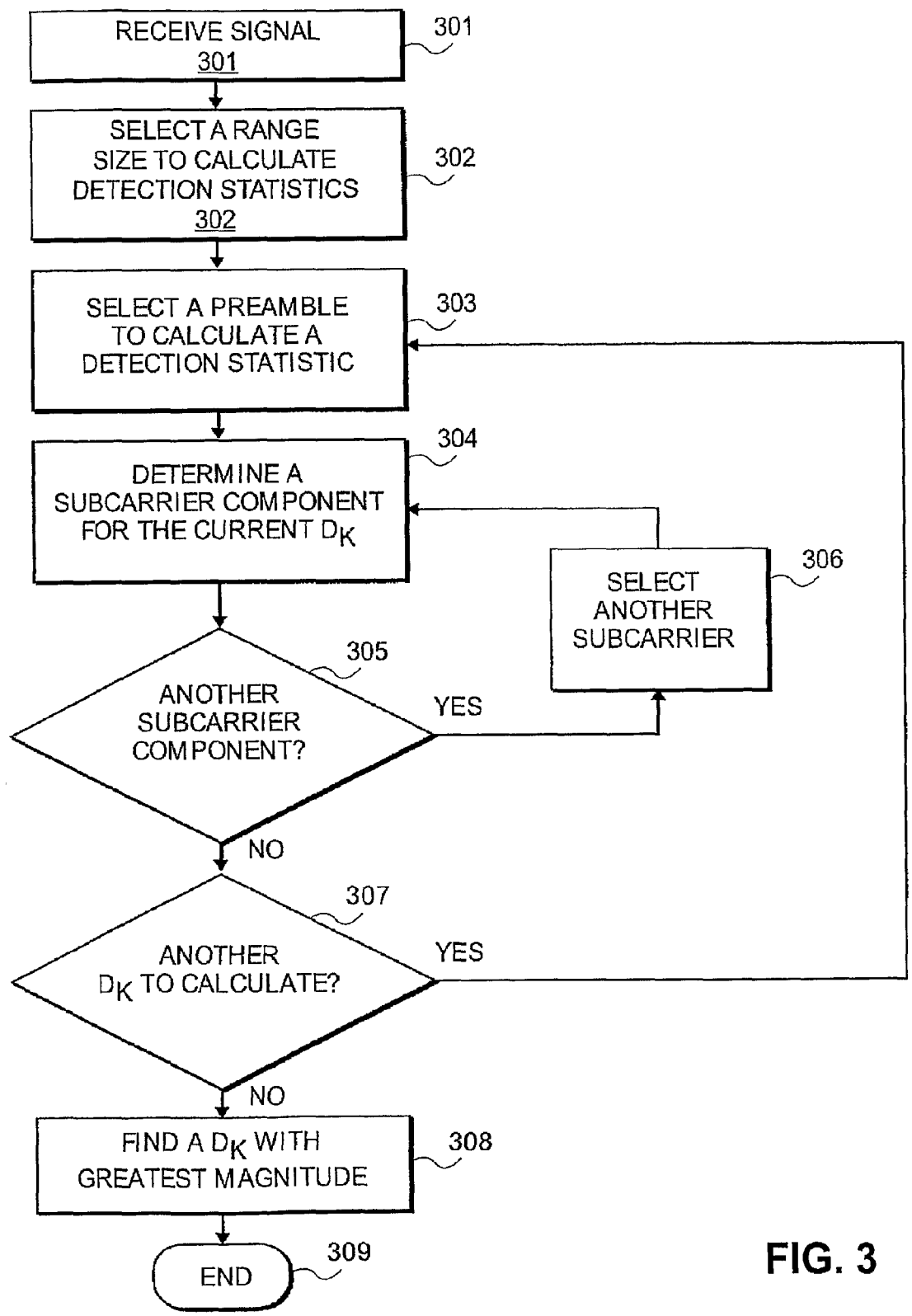
FIG. 3 is a flow diagram illustrating an algorithm for implementing one embodiment of the invention.

FIG. 3 illustrates a technique for determining a detection statistic for a received signal having a corresponding preamble. An OFDM(A) signal is received 301 which has a corresponding transfer function and preamble, as described by equation (1) above. The transfer function H(n) is unknown, so an estimate Ĥ(n) may be used in calculating the preamble of the received signal. In this case, the use of linear approximation to arrive at an estimate Ĥ(n) may include selection of a range size 302 which represents a number of subcarrier frequencies neighboring a given subcarrier in the frequency domain. To find a minimized D for equation (3) using two neighboring subcarrier frequencies of a given subcarrier n, the estimate of transfer function H(n) can be written as:

$$\hat{H}(n) = \frac{1}{2}\left[\left(\frac{y(n-1)}{s(n-1)}\right) + \left(\frac{y(n+1)}{s(n+1)}\right)\right] \quad (4)$$

In equation (4), s(n−1) and s(n+1) represent, respectively, the preamble s in the frequency domain at the subcarrier below and above subcarrier n. For the estimate Ĥ(n), the detection statistic D for preamble s would be calculated as:

$$D = -\sum_{n=1}^{N}\left|y(n) - \frac{1}{2}\left[\left(\frac{y(n-1)}{s(n-1)}\right) + \left(\frac{y(n+1)}{s(n+1)}\right)\right]s(n)\right|^2 \quad (5)$$

The accuracy of the transfer function estimate may be improved by employing more neighboring subcarriers of n, for example, four:

$$\hat{H}(n) = \frac{1}{4}\left[\left(\frac{y(n-2)}{s(n-2)}\right) + \left(\frac{y(n-1)}{s(n-1)}\right) + \left(\frac{y(n+1)}{s(n+1)}\right) + \left(\frac{y(n+1)}{s(n+1)}\right)\right] \quad (6)$$

Calculation of the detection statistic D would change accordingly to reflect the different approximation method for Ĥ(n). Different range sizes may be used. However, range size may be limited where the channel is frequency selective—i.e. channel subcarriers have different channel gains. Various embodiments contemplate weighting components of estimate Ĥ(n) to account for frequency selective channels. Furthermore, other a priori assumptions may be needed calculate the detection statistic D, depending on what information about the OFDM(A) signal is available on the receiver side.

After selecting a range size 302 for making a transfer function estimate Ĥ(n), a detection statistic $D_k$ may be calculated for each preamble $s_k$ in the set of preambles $s_1, s_2, \ldots s_K$. Calculation of these detection statistics $D_1, D_2, \ldots D_K$ is represented by processes 303, 304, 305, 306, 307. At 303, a preamble $s_k$ is chosen for the calculation of the corresponding $D_k$. A subcarrier n is selected, and a component of the detection statistic $D_k$ corresponding to the subcarrier n is determined 304. This determination of subcarrier components of the detection statistic $D_k$ is repeated for all N subcarriers 305, 306. Once all of the components are determined, the detection statistic $D_k$ for the chosen preamble $s_k$ is represented by the sum of the subcarrier components as:

$$D_k = -\sum_{n=1}^{N}\left|y(n) - \frac{1}{2}\left[\left(\frac{y(n-1)}{s_k(n-1)}\right) + \left(\frac{y(n+1)}{s_k(n+1)}\right)\right]s_k(n)\right|^2 \quad (7)$$

In equation (7), $s_k(n-1)$ and $s_k(n+1)$ represent, respectively, the preamble $s_k$ in the frequency domain at the subcarrier below and above subcarrier n.

Calculation of the detection statistic D based on this linear approximation Ĥ(n) of the transfer function H(n) can take other forms, depending on the nature of the received OFDM (A) signal. For example, in a case where the subcarriers of the received signal is BPSK-modulated, s(n) for any given subcarrier n may take only the values +1 and −1. Therefore, through algebraic manipulation of equation (5), the transfer function estimate on the n-th subcarrier may be expressed by the simplified expression:

$$D_k = -\sum_{n=1}^{N} \left| y(n)s_k(n) - \frac{1}{2} \left[ \begin{array}{c} y(n-1)s_k(n-1) + \\ y(n+1)s_k(n+1) \end{array} \right] \right|^2 \quad (8)$$

Once all detection statistics $D_1, D_2, \ldots D_K$ have been calculated 307, the preamble of an interfering signal can be identified 308 by the magnitude of the detection statistic corresponding to the interfering preamble. Standard statistical methods are available, for example, to identify one or more detection statistics which fall outside some standard deviation of a mean value of all calculated detection statistics $D_1, D_2, \ldots D_K$. After identification of detection statistics associated with interfering preambles, 309, adaptive communications techniques may be selected by an OFDM(A) transmitting system.

The preamble of an interfering signal may correspond to a relative maximum in the set of calculated detection statistics $D_1, D_2, \ldots D_K$ in an embodiment where a −1 factor has been omitted from calculation of a detection statistics D. However, other embodiments may identify a preamble of an interfering signal by finding a relative minimum in the set of calculated detection statistics $D_1, D_2, \ldots D_K$.

Figure 4:
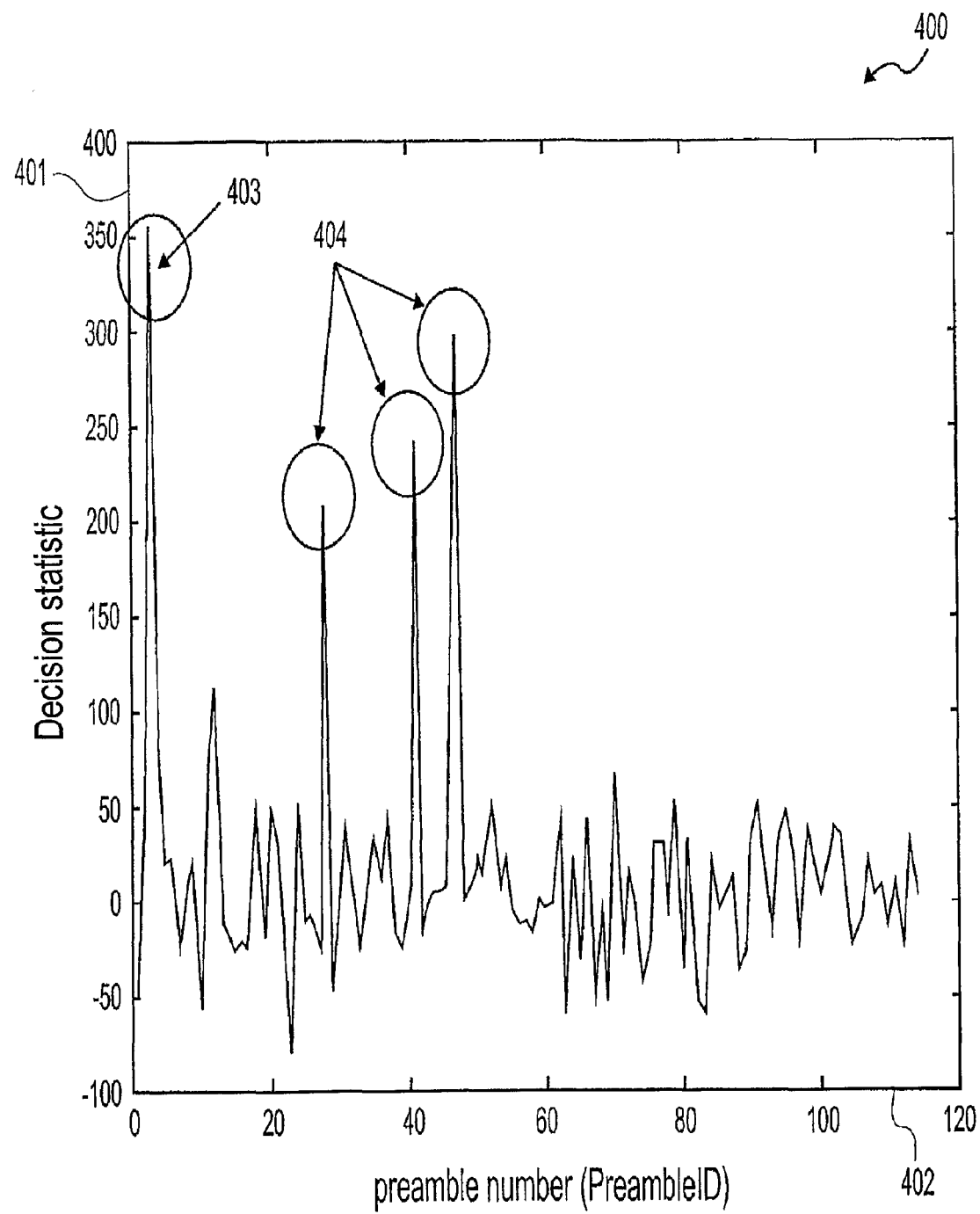
FIG. 4 is a graph illustrating detection statistic calculations for a set of preambles according to one embodiment of the invention

FIG. 4 shows a graph 400 illustrating the results of a calculation of detection statistics $D_1, D_2, \ldots D_K$ for a set of preambles $s_1, s_2, \ldots s_K$. The graph 400 includes a domain of preamble numbers 402, alternately known as preamble identifiers (Preamble_IDs). The graph 400 also includes a range of detection statistic values 401. In case of a realistic interference environment, several preambles may be mixed in the received signal. Thus the analysis may reveal several local maxima, each corresponding to a different preamble. This example shows a relative maximum 403 in the set of calculated detection statistics $D_1, D_2, \ldots D_K$, as well as a number of secondary maxima 404. These maxima 403, 404 each correspond to a Preamble_ID for a distinct signal mixed in the received signal.

One of the maxima, for example 403, may correspond to a preamble known to be used in the signal desired by the receiver. Each of the other maxima, for example 404, may represent a preamble used in a signal interfering with the signal desired by the receiver. Based on the identification of one or more Preamble_IDs in the received signal, the receiver may select wireless communications techniques appropriate to the channel environment, which includes the presence of the one or more interfering signals.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving an orthogonal frequency-division multiplexed (OFDM) signal representing a transfer function and a preamble, the preamble from a set of preambles;
   based on the received OFDM signal, calculating a different respective detection statistic for each preamble in the set of preambles, wherein for each preamble in the set of preambles, the calculated detection statistic for the each preamble is based on a respective probability that the OFDM signal represents the each preamble;
   selecting from the calculated detection statistics a detection statistic having a greatest magnitude; and
   selecting, from the set of preambles, a preamble corresponding to the preamble represented by the OFDM signal, the selecting based at least in part on the selected detection statistic.

2. The method of claim 1, wherein the OFDM signal is compliant with the Institute of Electrical and Electronics Engineers (IEEE) 802.16e standard.

3. The method of claim 1 further comprising making an estimate of the transfer function represented by the OFDM signal, the estimate to calculate a detection statistic for a preamble in the set of preambles.

4. The method of claim 3 wherein the OFDM signal includes a plurality of subcarrier signals, each subcarrier signal corresponding to a subcarrier frequency, and wherein making the estimate of the transfer function represented by the OFDM signal comprises:
   selecting a range size representing a number of subcarrier frequencies neighboring a given subcarrier frequency in a frequency domain; and
   calculating a component for the detection statistic corresponding to a given subcarrier frequency, the calculating based on the given subcarrier frequency and the range size.

5. The method of claim 1 further comprising selecting an OFDM communications technique based on the selected preamble.

6. The method of claim 5 wherein the communications technique includes an interference cancellation technique.

7. The method of claim 5 wherein the communications technique includes a signal decoding technique.

8. The method of claim 5 wherein the communications technique includes a dynamic frequency band selection technique.

9. The method of claim 5 wherein the communications technique includes an application scheduling technique.

10. An apparatus comprising:
    a signal processor to demultiplex an orthogonal frequency-division multiplexed (OFDM) signal into a plurality of subcarrier signals, each subcarrier signal corresponding to a subcarrier frequency, the OFDM signal representing a transfer function and a preamble, the preamble from a set of preambles;
    a calculating agent to calculate a different respective detection statistic for each preamble in the set of preambles, wherein for each preamble in the set of preambles, the calculated detection statistic for the each preamble is based on a respective probability that the OFDM signal represents the each preamble, the detection statistic of each preamble based at least in part on the subcarrier signals of the OFDM signal, the calculating agent further to select from the calculated detection statistics a detection statistic having a greatest magnitude, the calculating agent further to select from the set of preambles a preamble corresponding to the preamble represented by the OFDM signal, the selection based at least in part on the selected detection statistic.

11. The apparatus of claim 10, wherein the OFDM signal is compliant with the Institute of Electrical and Electronics Engineers (IEEE) 802.16e standard.

12. The apparatus of claim 10 the calculating agent further to estimate the transfer function represented by the OFDM signal, the estimate to calculate a detection statistic for a preamble in the set of preambles.

13. The apparatus of claim 12 wherein estimating a transfer function represented by the OFDM signal comprises:
   selecting a range size representing a number of subcarrier frequencies neighboring a given subcarrier frequency in a frequency domain; and
   calculating a component for the detection statistic corresponding to a given subcarrier frequency, the calculating based on the given subcarrier frequency and the range size.

14. The apparatus of claim 10 further comprising a communications control unit to select an OFDM communications technique based on the selected preamble.

15. The apparatus of claim 14 wherein the communications technique includes an interference cancellation technique.

16. A system comprising:
   a substantially omnidirectional antenna to receive an orthogonal frequency-division multiplexed (OFDM) signal;
   a signal processor to demultiplex the OFDM signal into a plurality of subcarrier signals, each subcarrier signal corresponding to a subcarrier frequency, the OFDM signal representing a transfer function and a preamble, the preamble from a set of preambles;
   a calculating agent to calculate a different respective detection statistic for each preamble in the set of preambles, wherein for each preamble in the set of preambles, the calculated detection statistic for the each preamble is based on a respective probability that the OFDM signal represents the each preamble, the detection statistic of each preamble based at least in part on the subcarrier signals of the OFDM signal, the calculating agent further to select from the set of preambles a preamble corresponding to the preamble represented by the OFDM signal, the selection based at least in part on the detection statistic calculated for the selected preamble.

17. The system of claim 16, wherein the OFDM signal is compliant with the Institute of Electrical and Electronics Engineers (IEEE) 802.16e standard.

18. The system of claim 16 the calculating agent further to estimate the transfer function represented by the OFDM signal, the estimate to calculate a detection statistic for a preamble in the set of preambles.

19. The system of claim 18 wherein estimating a transfer function represented by the OFDM signal comprises:
   selecting a range size representing a number of subcarrier frequencies neighboring a given subcarrier frequency in a frequency domain; and
   calculating a component for the detection statistic corresponding to a given subcarrier frequency, the calculating based on the given subcarrier frequency and the range size.

20. The system of claim 16 further comprising a communications control unit to select an OFDM communications technique based on the selected preamble.

21. The system of claim 20 wherein the communications technique includes an interference cancellation technique.

22. A non-transitory machine-readable storage medium having stored thereon instructions which, when executed by a set of one or more processors, cause said set of processors to perform a method comprising:
   receiving an orthogonal frequency-division multiplexed (OFDM) signal representing a transfer function and a preamble, the preamble from a set of preambles;
   calculating, based on the received OFDM signal, a different respective detection statistic for each preamble in the set of preambles, wherein for each preamble in the set of preambles, the calculated detection statistic for the each preamble is based on a respective probability that the OFDM signal represents the each preamble;
   selecting from the calculated detection statistics a detection statistic having a greatest magnitude; and
   selecting, from the set of preambles, a preamble corresponding to the preamble represented by the OFDM signal, the selection based at least in part on the selected detection statistic.

23. The non-transitory machine-readable storage medium of claim 22, wherein the OFDM signal is compliant with the Institute of Electrical and Electronics Engineers (IEEE) 802.16e standard.

24. The non-transitory machine-readable storage medium of claim 22, the method further comprising making an estimate of the transfer function represented by the OFDM signal, the estimate to calculate a detection statistic for a preamble in the set of preambles.

25. The non-transitory machine-readable storage medium of claim 24 wherein the OFDM signal includes a plurality of subcarrier signals, each subcarrier signal corresponding to a subcarrier frequency, and wherein making the estimate of the transfer function represented by the OFDM signal comprises:
   selecting a range size representing a number of subcarrier frequencies neighboring a given subcarrier frequency in a frequency domain; and
   calculating a component for the detection statistic corresponding to a given subcarrier frequency, the calculating based on the given subcarrier frequency and the range size.

26. The non-transitory machine-readable storage medium of claim 22, the method further comprising selecting an OFDM communications technique based on the selected preamble.

27. The non-transitory machine-readable storage medium of claim 26 wherein the communications technique includes an interference cancellation technique.

* * * * *